United States Patent

[11] 3,622,967

[72] Inventors: Manus R. Foster, Irving; Raymond L. Sengbush, Austin, both of Tex.
[21] Appl. No. 774,152
[22] Filed Nov. 7, 1968
[45] Patented Nov. 23, 1971
[73] Assignee Mobil Oil Corporation

[54] OPTIMUM STACK
8 Claims, 3 Drawing Figs.
[52] U.S. Cl. .................................................. 340/15.5 MC, 340/15.5 TC, 340/15.5 DP
[51] Int. Cl. ................................................. G01v 1/28
[50] Field of Search ........................................... 340/15.5 MC

[56] References Cited
UNITED STATES PATENTS
3,398,396 8/1968 Embree .................. 340/15.5
3,108,250 10/1963 Landrum et al. ............. 340/15.5

Primary Examiner—Rodney D. Bennett, Jr.
Assistant Examiner—Daniel C. Kaufman
Attorneys—William J. Scherback, Frederick E. Dumoulin, Arthur F. Zobal, Andrew L. Gaboriault and Sidney A. Johnson ABSTRACT: Seismic traces are weighted and stacked to produce an estimated output trace having improved signal-to-noise ratio. Those traces having the highest signal-to-noise ratio are weighted more heavily. The weights for each trace are determined from a detection of the signal between the estimated output trace and each of the seismic traces. The procedure is iterated so that the signal-to-noise ratio of the estimated output trace is progressively improved by recomputing the weights of the individual traces on each pass.

OPTIMUM STACK

BACKGROUND OF THE INVENTION

This invention relates to techniques for processing seismograms by applying optimum weighting coefficients to seismic traces being stacked and more particularly to applying weighting coefficients which are based upon the signal-to-noise ratio of the seismic traces.

In the processing of seismograms to make them more readily interpretable, it is common to mix traces from different records to produce a composite record. Such a technique is commonly referred to as stacking. For example, a vertical stack is a mix of records from shots at different depths to attenuate ghosts. Alternatively, records of several shots made in nearly the same location are mixed together. Such a technique is used especially with surface sources in which the records from several successive weight drops, vibrations, pops, etc., are added together without making different static or dynamic corrections to the components before adding.

Another technique is common depth point stacking wherein a composite is produced of traces which correspond to the same subsurface reflecting point but which are from different profiles and having different offset distances. In this case, the records are corrected for statics and normal moveout before stacking. Such a technique, commonly referred to as horizontal stacking, is shown in U.S. Pat. No. 2,732,906 Mayne.

In another technique, referred to as velocity filtering, advantage is taken of the differing moveout time of reflections and multiples to eliminate the multiples from the composite, or stacked, record. Such a velocity-filtering technique is described in "Optimum Multi-Channel Velocity Filters," R. L. Sengbush and M. R. Foster, Geophysics, Vol. 33, No. 1 (Feb. 1968), pages 11–35.

Some seismic records, or traces, will always have better signal-to-noise ratios than others. In any stacking process, it is desirable to emphasize the records having the best signal-to-noise ratio. For example, it is a common practice for an operator to use his judgement in selecting the best traces from a group of records and to use these to produce the stack. While this technique is useful, it does not have the desired effect of producing consistently good results.

SUMMARY OF THE INVENTION

Accordingly, it is an important object of the present invention to improve stacking techniques by applying optimum weighting coefficients to the seismic traces being stacked.

In accordance with one aspect of the invention, seismic traces are stacked using as weights for each trace the components $A_j$ of the eigenvector of the matrix $p_{bk}$ corresponding to its largest eigenvalue where the matrix is defined by:

$$\rho_{ik} = \sum_{l=n}^{l=n} V_j(l) V_k(l)$$

where $V_j(l)$ is the $l$th sample of the $j$th trace and $V_k(l)$ is the $l$th sample of the $k$th trace.

More specifically, the samples of each seismic trace are multiplied by amplitude coefficients which, for the successive seismic traces, are denoted $A_1, A_2 \ldots A_m$, where $m$ is the number of seismic traces, to produce a signal estimate for trace. The signal estimates of all of the $m$ traces are stacked to produce an estimated output trace. The signal between this estimated output trace and each of the traces is detected to produce new amplitude coefficients for each trace. In one embodiment, the signal detection is by zero lag cross-correlation between a window of the estimated output trace and the corresponding window of each seismic trace. The new amplitude coefficients are multiplied by each of the seismic traces to produce new signal estimates for each trace. These new signal estimates are then stacked.

Stacking of the traces is iterated a number of times, each with a better estimate of the weighting coefficient, so that the singal-to-noise ratio of the estimated output trace is progressively improved. As the signal-to-noise ratio of the estimated output trace improves, the more meaningful the zero lag correlation becomes and the more accurately the weights may be computed.

In addition to reducing the weights of noisy traces, the technique eliminates dead traces and corrects the polarity of reversed traces. Accordingly, it is another object of the present invention to replace the method of visual examination of records previously used to determine the fault in traces being stacked.

It is still a further object of the present invention to provide a stacking technique of the type described above which progressively develops weighting coefficients which identify the trace, or traces, having the best signal-to-noise ratio.

The foregoing and other objects, features and advantages of the invention will be more apparent from the following more detailed description and appended claims together with the drawings.

DESCRIPTION OF PARTICULAR EMBODIMENTS

Figure 1:
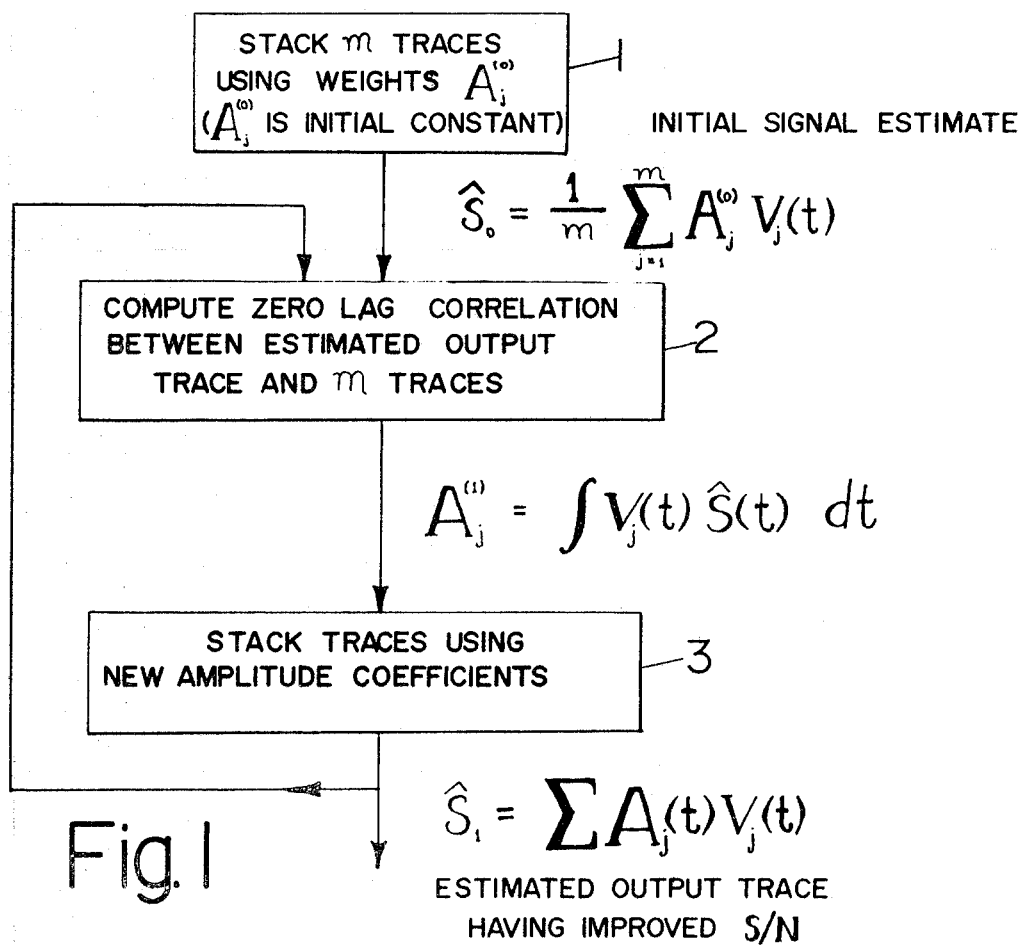
FIG. 1 is a block diagram of the digital computer implementation of the invention.

Referring to FIG. 1, the process of this invention as performed on a general purpose digital computer is shown in block diagram form. As indicated at 1, the $m$ seismic traces are first stacked using an initial constant for the weight for each trace. That is, $A_1^{(0)}$ is the initial weight which is multiplied by the first trace; $A_2^{(0)}$ is the initial constant multiplied by the second trace, and so on. The coefficients $A_j^{(0)}$ may be all the same constant, for example, 1. Alternatively, the initial constants may be set in accordance with predetermined knowledge of the signal-to-noise ration of each trace. For example, the operator may know that certain trace numbers will most likely have better signal-to-noise ratios than others. For example, in certain types of seismic exploration the traces furthest from the shotpoint may normally have low signal-to-noise ratios. Therefore, these may initially be given a low weight by the operator.

Figure 2:
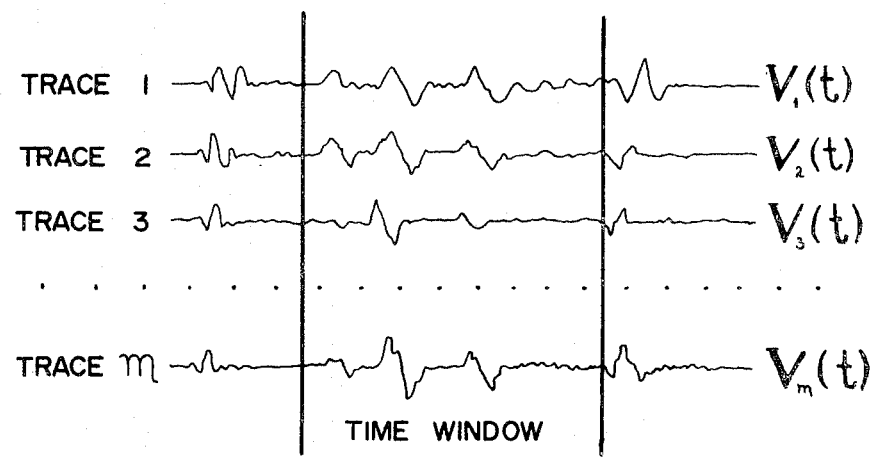
FIG. 2 shows a set of seismic traces.

Having determined an initial signal estimate for each trace, and having stacked the initial signal estimates as indicated at 1 to produce the signal $\hat{S}_o$ the process proceeds to the step indicated at 2. A detection is made of the signal between the estimated output trace $\hat{S}_o$ and a window from each seismic trace. In FIG. 2, there is depicted a set of $m$ seismic traces. It will be noted that the same time window is selected from each trace. The selection of a time window is arbitrary. The corresponding time window from the estimated output trace $\hat{S}_o$ is cross-correlated with the time window from each trace to detect the signal between the two traces. It will be understood that many signal detection techniques are available and their use is within the scope of this invention. One of the better signal detection techniques is the computation of the zero lag correlation between the window on each seismic trace and the corresponding window on the estimated output trace. In the computation of zero lag correlation, a sample on the window of the seismic trace is multiplied by the corresponding sample in the time window of the estimated output trace. All samples are multiplied by their corresponding samples in the estimated output trace. The products are summed, or integrated, to produce a signal representing the zero lag correlation between the windows.

For the first trace, the new amplitude coefficient is denoted $$A_1^1 = \int V_1(t) \hat{S}_o(t) dt$$

For the second trace, the new amplitude coefficient is denoted $$A_2^1 = \int V_2(t) \hat{S}_o(t) dt$$

Similarly, the new amplitude coefficients for each of the remaining traces are computed.

Using these new amplitude coefficients, the traces are again stacked as indicated at 3. This produces a new estimated output trace $\hat{S}_1$. The new estimated output trace $\hat{S}_1$ is used to compute the zero lag correlations as indicated at 2. Steps 2 and 3 are iterated a number of times.

The number of iterations may be fixed. For example, the steps may be performed four times. Alternatively, the number of iterations may be based upon the criteria of whether the new amplitude coefficient differs from the old amplitude coefficient by a given error tolerance. That is, after step 3 the difference is taken between the new coefficient, for example, $A_1^{(2)}$ and the old coefficient $A_1^{(1)}$. If this difference is greater than a given error tolerance, the steps 2 and 3 are iterated again. If not, the procedure stops.

As another modification, the coefficients may be normalized after each performance of step 2. Many suitable normalizing procedures are available. One commonly used procedure is to normalize all amplitude coefficients so that none of them exceed a value of 1.

A perfect match in the signal of the seismic trace window with the signal of the estimated output trace window will produce a coefficient of 1. Cross-correlations indicating any less than a perfect match produce a correspondingly lesser value of amplitude coefficients.

While the inventive process depicted in FIG. 1 is useful for all types of stacking operations, as previously described, it has great usefulness for other procedures. One particularly suitable application of the present invention is its use in a process wherein one trace out of a group of traces must be used as a pilot trace. In such a procedure, the trace having the best signal-to-noise ratio should be selected as the pilot trace. The procedure in FIG. 1 can be used for such a selection. The traces are stacked several times, as indicated in FIG. 1. Then, the trace with the maximum coefficient is picked as the pilot trace.

The process of the present invention is particularly suitable for performance on most general purpose digital computers. Although the invention can be implemented with many different programs, one particular program is listed below. This routine is in FORTRAN, described, for example, in *Fortran Autotester*, by Robert E. Smith and Dora E. Johnson, John Wiley & Sons, Inc. New York, New York, Oct. 1964; and *Introduction to Fortran*, by S. C. Plumb, McGraw-Hill, New York, New York.

The input parameters for the program are as follows:
A—input trace array; traces are packed one after another— serially in tandem. It is assumed that there are six traces to be stacked, i.e., K=1,6.
ST—stacked traces array.
NSA—number of samples in each trace.
J—the sample number; for each trace J=1,NSA.
AMP—the array of weights of coefficients.
NIT—number of iterations.
NSW—number of samples in correlation window.
NFS—first sample number in the correlation window.

The program listing is as follows:
```
5 DIMENSION A(1),ST(1),AMP(1)
10 DO 15 J=1,6
15 AMP(J)=1.0
20 DO 85 N=1,NIT
22 IND=0
25 DO 30 J=1,NSA
30 ST(J)=0.0
35 DO 50 K=1,6
40 DO 45 J=1,NSA
45 ST(J)=ST(J)+AMP(K)*A(J+IND)
50 IND=IND+NSA
52 IND=0
55 DO 80 K=1,6
60 AMP(K)=0.0
65 KK=NSW+NFS
70 DO 75 J=NFS,KK
75 AMP(K)=AMP(K)+ST(J)*A(J+IND)
80 IND=IND+NSA
85 CALL TRMR(AMP,1.0,1,6)
86 CALL TRMR(ST,2046.,1,NSA
90 RETURN
END
```

The normalizing subroutine, referred to as TRMR, is as follows:
```
SUBROUTINE TRMR(A,B,LSTRT,LSTP)
5 DIMENSION A(1)
7 TEMP=0.0
10 DO 30 J=LSTRT,LSTP
15 ABK=ABSF(A(J))
20 IF(ABK—TEMP)30,30,25
25 TEMP=ABK
30 CONTINUE
32 ABK=B/TEMP
35 DO 40 J=LSTRT,LSTP
40 A(J)=A(J)*ABK
55 CONTINUE
RETURN
END
```

Referring to the above, instruction 5 reserves storage for the input trace array A(1), the stacked traces array ST(1), and the array for the coefficients AMP(1).

Instructions 10 and 15 are a do-loop which initially sets the values of each coefficient AMP(J) at 1.0. The loop is performed six times, i.e., from J=1 to J=6.

Instruction 20 initiates a do-loop which continues through instruction 85. This loop is iterated a number of times NIT. The number of iterations may commonly be four through nine.

Instruction 22 sets the dummy variable IND initially to zero.

Instructions 25 and 30 are a do-loop which sets the array ST(J) to zero. That is, this array is cleared for insertion of the stacked traces.

Instructions 35 to 50 are a do-loop for stacking each of six traces. These instructions are performed six times, once for each of the six traces, K=1,6.

Instructions 40 and 45 multiply each sample in a trace by its corresponding coefficient and add it to the corresponding sample of traces already in ST(J) to produce stacked traces. For example, initially ST(J) is set to zero. AMP(K) is one. This is multiplied by the input trace in array A(J+IND). IND is zero, therefore, the coefficient 1 is multiplied by each sample in the first trace.

Upon the first completion of the loop including instructions 40 and 45, IND is incremented by NSA. In instruction 50, NSA is the number of samples in the first trace so that on second performance of the do-loop 40, 45 the operation is performed on the second trace. Referring back to instruction 45, ST(J) is set equal to ST (that is, the first trace multiplied by the coefficient of 1 as obtained as described above, plus the second trace, that is, the samples from number NSA on are multiplied by the coefficient A which is 1).

This process is repeated for each of the input traces. The result is that there is produced a stacked trace where each of the samples in each trace have been multiplied by a coefficient of 1.

Upon the first completion of the do-loop extending from instructions 35 to 50, that is, when all six traces have been stacked, the instruction 52 sets IND back to zero.

Instructions 55 through 80 are a do-loop which computes the new coefficients. Instruction 60 initially sets the value AMP(K) to zero.

Instruction 65 sets KK equal to the end sample of the correlation window. That is, NFS is the number of the first sample in the window to be correlated. NSW is the number of samples in the correlation window. Their sum, KK, is the end of the correlation window.

Instructions 70 and 75 are a do-loop which is repeated from NFS, the first sample in the correlation window, to KK, the last sample in the correlation window. Instruction 75 sets the amplitude coefficient AMP(K) equal to the amplitude coefficient previously determined plus the product of the stacked trace ST(J) multiplied by the input trace A(J+IND).

The first completion of the do-loop 70, 75 determines the new amplitude coefficient AMP(K) for the first input trace. Then, IND is incremented by NSA, at instruction 80, so that the do-loop 55, 80 is performed for the second trace. The new amplitude coefficient is determined for the second trace. The instructions 55, 80 are performed for each of the traces.

Instruction 85 calls up a normalizing subroutine TRMR which normalizes the new amplitude coefficients so that the maximum value is 1.

Upon the first completion of the do-loop 20, 85, the new amplitude coefficients have been determined. Then, this entire do-loop is iterated. The loop is iterated a set number of times NIT. Normally, four iterations will be sufficient. After four iterations, the array ST contains the traces which have been stacked with amplitude coefficients giving the greatest weight to the best signal-to-noise ratio trace. The stacked trace is one having improved signal-to-noise ratio.

In order to normalize the stacked trace, the instruction 86 calls up the normalizing subroutine TRMR(ST,2046.,1,NSA). The normalized stacked trace is ready for printout or display in accordance with conventional techniques.

The preferred mode of carrying out the present invention is by way of a properly programmed digital computer as previously discussed. However, the principles of this invention are also applicable to the operation of analog equipment. Therefore, the invention will be described in conjunction with the use of conventional analog apparatus for the benefit of the users of such apparatus.

Figure 3:
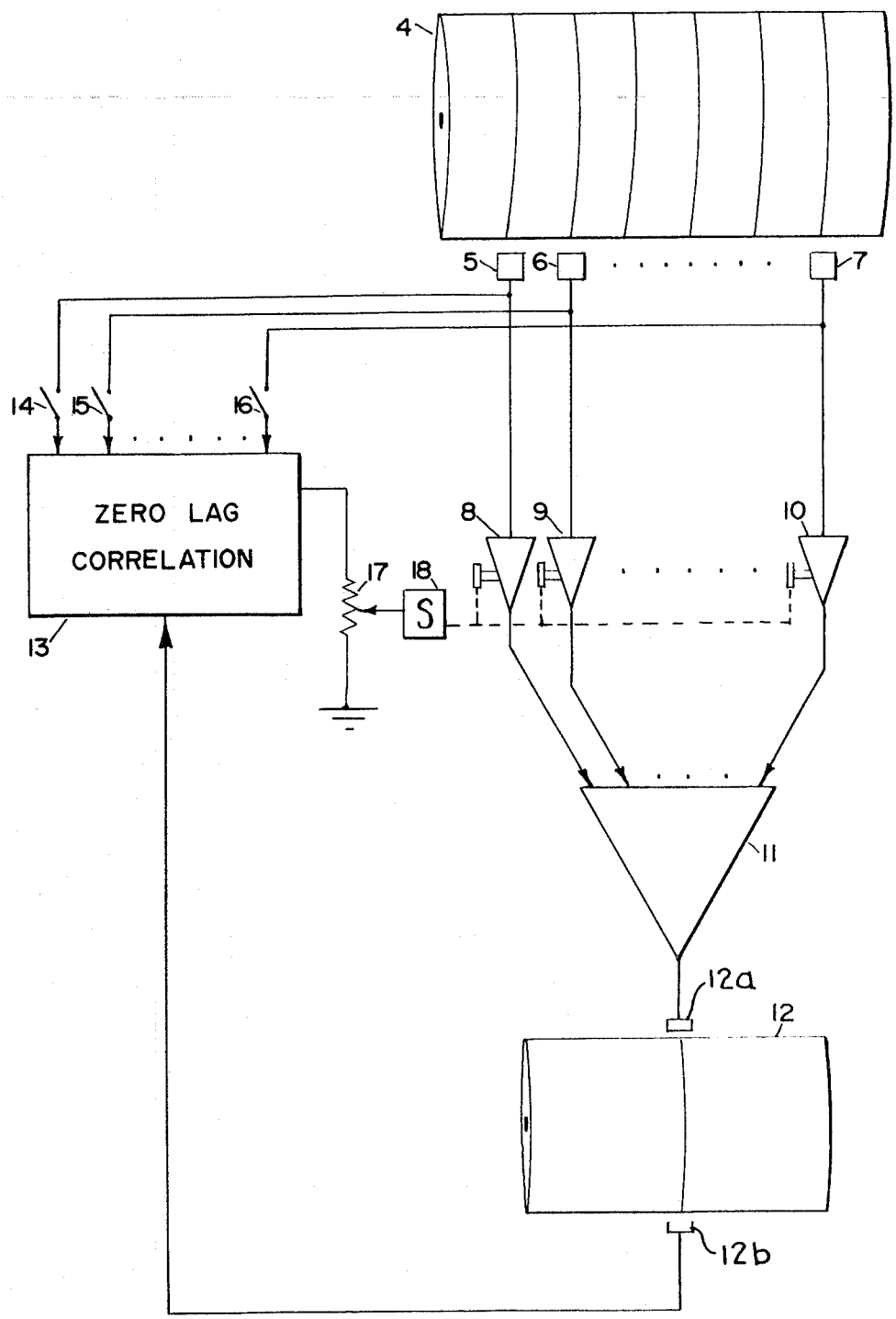
FIG. 3 shows an analog implementation of the present invention.

FIG. 3 depicts conventional analog stacking apparatus including the magnetic drum 4 upon which have been recorded seismic traces. The recorded seismic signals are simultaneously played back by pickup heads 5, 6 and 7. The resultant signals are applied to amplifiers 8, 9 and 10 which have adjustable gain. By adjusting the gains of each of the amplifiers, the coefficients, or weights, of each seismic trace can be accordingly varied. The amplifiers 8, 9 and 10 multiply each of the samples by amplitude coefficients $A_1$, $A_2$, $A_3$, and so on. Initially, each of the amplifiers are set to the same gains, which gain is arbitrarily denoted as a unity coefficient. The outputs of amplifiers 8, 9 ... 10 are the signal estimates for each trace. The signal estimates are summed, or stacked, in summing amplifier 11. The output of summing amplifier 11, the estimated output trace, is recorded, by way of recording head 12a, on the magnetic drum recorder 12.

The estimated output trace recorded on magnetic drum 12 can be reproduced by playback head 12b. A window of the estimated output trace is reproduced by the playback head 12 and cross-correlated with the corresponding time window from each of the seismic traces recorded on drum 4. While the window selection circuitry has not been shown in FIG. 3, it will be appreciated that it is well within the skill of the art to select a given portion or window of each seismic trace and of the estimated output trace.

As an example, a portion of trace 1 is reproduced by playback head 5 at the same time that the corresponding time window of the estimated output trace is reproduced by the head 12b. The zero lag cross-correlation is performed as indicated at 13. In this case, the switch 14 is closed to apply the portion of the first trace to this circuitry. Zero lag cross-correlation can easily be performed with an analog circuit since it is a point-by-point multiplication of two signals and a summation, or integration, of the resultant product. The resultant voltage is normalized, for example, by proper setting of the potentiometer 17. The normalized voltage on the contact of the potentiometer 17 is the new amplitude coefficient $A_1$ for the first trace. This is applied to the conventional servosystem 18 which sets the gain of the amplifier 8 to the new value corresponding with the new amplitude coefficient.

The same procedure is followed for each of the other traces to produce new amplitude coefficients $A_2$ ... $A_m$. The gains of amplifiers 9 ... 10 are set accordingly.

Again, the seismic traces are stacked with the new amplitude coefficients applied to each trace. The resultant new estimated output trace, recorded on drum 12, is used to determine new amplitude coefficients for each of the amplifiers. The procedure is iterated a number of times, for example, a given number of times such as four or five times.

THE UNDERLYING THEORY OF THE INVENTION

While the foregoing examples of particular embodiments of the invention are practical applications, other modifications and embodiments are well within the scope of the invention. These modifications and the scope of the invention will be better understood from the following description of the basic principles underlying the invention and more particularly from a derivation of the equations upon which these principles are based.

The assumed model is $$V_j(l) = A_j S(l) + N_j(l) \quad (1)$$

in which $S(l)$ is the $l$th sample of the desired signal, $N_j(l)$ is the $l$th sample on the $j$th trace of the corrupting noise, and $V_j(l)$ is the $l$th sample of the $j$th trace. These samples are taken within a time window.

The time window is arbitrarily chosen both as to location and length. We suppose there are $n$ samples within this window of each trace. Thus, $l$ runs from 1 to $n$. We further suppose that there are $m$ traces so that $j$ runs from 1 to $m$.

Under the assumption that the noise samples are gaussian with zero mean, constant variance $\sigma^2$ and are uncorrelated, the probability density of the trace samples, $V=[V_j(l)|j=1,m;l=1,n]$ for a given choice weights $A=[A_j\ j=1,m]$ and signal $S=[S(l)\ l=1,n]$ is:

$$p(V|A,S) = \frac{1}{(2\pi\sigma^2)m/2} e^{-\frac{1}{2\sigma^2}\sum_{j=1}^{m}\sum_{l=1}^{m}(V_j(l)-A_jS(l))^2} \quad (2)$$

The well-known statistical technique of maximum likelihood estimation dictates that the weights A and signal samples S are chosen so as to make this probability a maximum. An examination of the form of $p(V|A,S)$ shows that it will be a maximum if and only if $$\sum_{j=1}^{m}\sum_{l=1}^{n}(V_j(l)-A_jS(l))^2 \quad (3)$$

is a minimum. (The above expression (3) will hereafter be denoted $\Phi$.) If a set of weights A and a set of samples S make $\Phi$ a minimum, then replacing the weights by a factor $\alpha$ times A and the signal samples by a factor $1/\alpha$ times S will leave $\Phi$ unchanged. Consequently, there are many solutions which only differ in the amplitude of the signal S. In seismic work, it is common to adjust this amplitude to conform to display requirements, so any one of the many solutions which make $\Phi$ a minimum will satisfy the requirement of maximizing the probability density of the trace samples. One solution is the one for which:

$$\sum_{j=1}^{m} A_j^2 = 1 \quad (4)$$

Now in order that $\Phi$ be a minimum, it is necessary that $$\alpha\Phi/\alpha S(l) = 0$$

Carrying out the differentiation and using the above condition (4) this gives $$S(l) = \sum_{j=1}^{m} A_k V_k(l) \quad (5)$$

Putting relation (5) back into the expression (3) and using some simple algebraic manipulation gives $$\phi = C - \sum_{j=1}^{m} \sum_{k=1}^{m} \rho_{jk} A_j A_k \quad (6)$$

where $$C = \sum_{j=1}^{m} \sum_{l=1}^{n} V_j(l)^2$$

and $$\rho_{jk} = \sum_{l=1}^{n} V_j(l) V_k(l) \quad (7)$$

The problem is to choose the weights A so as to make expression (6) a minimum. This is clearly the same as making $$\sum_{j=1}^{m} \sum_{k=1}^{n} \rho_{jk} A_j A_k \quad (8)$$

a maximum. The problem of maximizing (8) subject to the condition (4) is well known to be equivalent to the following eigenvalue problem:

Find the eigenvector A of the matrix $\rho = [\rho_{jk}]$ corresponding to the largest eigenvalue $\lambda$ and having length 1. [A is an eigenvector of $\rho$ belonging to the eigenvalue $\lambda$ if $\rho A = \lambda A$ and $A \neq 0$].

There are many methods available for computing this desired eigenvector. One which is very commonly used consists of the following steps:

(i) Define $A_j^{(o)}$ $1/m$
(ii) Assume that $A_j^{(v)}$ has been determined, and compute $Z_j$ from the relation:

$$Z_j = \sum_{k=1}^{m} \rho_{jk} A_k^{(v)} \quad j = 1, m$$

(iii) Define $$A_j^{(v+1)} = Z_j \Big/ \sqrt{\sum_{k=1}^{m} Z_k^2}$$

(iv) Test to see if $(A_j^{(v+1)} - A_j^{(v)})$ for $j = 1, m$ where $\epsilon$ is an error tolerance.

If not, increase $v$ by 1 and return to (ii). If so, accept $A^{(v+1)}$ as a suitable approximation to the desired solution.

There are a number of modifications which can be made which superficially make the above algorithm look a little different. In step (iii), for example, we normalize $A^{(v+1)}$ to unit length. This is not strictly necessary. As pointed out above, the length of the eigenvector does not really matter since in application S is always normalized anyway. Hence step (iii) can be dispensed with or some simpler normalization procedure can be used.

In step (ii), we can make use of the definition (7) to write:

$$Z_j = \sum_{l=1}^{n} V_j(l) \sum_{k=1}^{m} V_k(l) A_k^{(v)} \quad (9)$$

and this we can break into two steps by defining $$S^{(v)}(l) = \sum_{k=1}^{m} A_k^{(v)} V_k(l) \quad (10)$$

$$Z_j = \sum_{l=1}^{n} V_j(l) S^{(v)}(l) \quad (11)$$

The length of $Z$ can be controlled by normalizing $S^{(v)}$ before carrying out the determination of expression (11). Thus a procedure which is essentially equivalent to the algorithm (i)–(iv) is the following:

(i) Define $A_j^{(o)} = 1/m$ (actually, the length of $A^{(o)}$ is not important either. We could just as well pick $A_j^{(o)} = 1$).
(ii) Given $A_j^{(v)}$ compute $$S^{(v)}(l) = \sum_{k=1}^{m} A_k^{(v)} V_k(l)$$

(iii) Normalize $S^{(v)}$
(iv) Compute $$Z_j = \sum_{l=1}^{n} V_j(l) S^{(v)}(l)$$

(v) Define $A_j^{(v+1)} = Z_j$
(vi) Include some procedure for deciding when to stop the iteration on $v$. This could be simply to stop when $v+1$ is some fixed number, or it could be something more elaborate as in the first algorithm above. When the iteration is stopped then $$S^{(v+1)}(l) = \sum_{j=1}^{m} A_j^{(v+1)} V_j(l) \quad l = 1, n$$

, suitably normalized, is the desired output. Otherwise, $v$ is increased by 1 and we return to (ii).

It is this second version of the algorithm which is implemented in the program previously described.

The essential feature of the method is to stack the traces $V_j(l)$ using as weights the components $A_j$ of the eigenvector of the matrix $\rho$ defined by equation (7) corresponding to its largest eigenvalue.

Of course, it will be understood that various modifications may be made without departing from the principles of the invention. The appended claims are, therefore, intended to cover any such modifications within the true spirit and scope of the invention.

What is claimed is:

1. The method of utilizing automatic computing apparatus to stack $m$ seismic traces to produce an estimated output trace having improved signal-to-noise ratio comprising:

1. Multiplying the samples of each seismic trace by amplitude coefficients $A_j$ which for the successive seismic traces are denoted $A_1, A_2 ... A_m$ where $m$ is the number of seismic traces, and where the amplitude coefficients are initially set equal to predetermined constants to produce a signal estimate for each trace,
 2. Stacking the signal estimates of all of the $m$ traces to produce an estimated output trace,
 3. Detecting a signal which is a function of both said estimated output trace and each of said traces to produce new amplitude coefficients $A_1, A_2 ... A_m$ for each trace, and
 4. Iterating steps 1 through 3 using said new amplitude coefficients to produce an estimated output trace having improved signal-to-noise ratio.

2. The method recited in claim 1 wherein each of said steps is carried out on an automatic stored program digital computer.

3. The method recited in claim 1 wherein the step of detecting the signal includes computing the zero lag correlations between said estimated output trace and each of said signal traces to produce a zero lag cross-correlation function for each trace.

4. The method recited in claim 3 wherein the zero lag cross-correlation function between said estimated output and each of said seismic traces is normalized to produce a new amplitude coefficient for each trace.

5. The method recited in claim 1 wherein said predetermined constants are initially set equal to 1.

6. The method recited in claim 1 wherein said predetermined constants are initially set for each trace in accordance with predetermined knowledge of the signal-to-noise ratio of each trace.

7. The method recited in claim 1 wherein the steps (1) through (3) are iterated a predetermined number of times.

8. The method recited in claim 1 wherein the steps (1) through (3) are iterated until the difference between said new amplitude coefficients and the corresponding amplitude coefficients determined from the previous iteration is less than a preset error tolerance.

* * * * *

UNITED STATES PATENT OFFICE
CERTIFICATE OF CORRECTION

Patent No. 3,622,967          Dated November 23, 1971

Inventor(s) Manus R. Foster and Raymond L. Sengbush

It is certified that error appears in the above-identified patent and that said Letters Patent are hereby corrected as shown below:

Column 1, lines 53 to 56, that portion of the formula reading $$\sum_{1=n}^{1=n} \quad \text{should read} \quad \sum_{\ell=1}^{\ell=n}$$

Column 2, line 50 and line 54, "$S_o$" should read -- $\hat{S}_o$ --;

lines 70 to 72, that portion of the formula reading $A_1^1$ should read $A_1^{(1)}$ ;

lines 74 and 75, that portion of the formula reading $A_2^1$ should read $A_2^{(1)}$ .

Column 6, line 31, after "choice" insert --of--;

lines 33 to 38 (formula (2)), that portion of the formula reading $$\sum_{1=1}^{m} \quad \text{should read} \quad \sum_{\ell=1}^{m} \quad ;$$

lines 45 to 47 (formula (3)), that portion of the formula reading $$\sum_{1=1}^{n} \quad \text{should read} \quad \sum_{\ell=1}^{n} \quad .$$

Column 6, formula (5), that portion of the formula reading $$\sum_{j=1}^{m} \quad \text{should read} \quad \sum_{k=1}^{m}$$

UNITED STATES PATENT OFFICE
CERTIFICATE OF CORRECTION

Patent No. 3,622,967  Dated November 23, 1971

Inventor(s) Manus R. Foster and Raymond L. Sengbush

It is certified that error appears in the above-identified patent and that said Letters Patent are hereby corrected as shown below:

Column 7, formula (6), that portion of the formula reading $$\sum_{k=1}^{m} \quad \text{should read} \quad \sum_{k=1}^{n} \quad ;$$

lines 6 to 8, lines 10 to 12, lines 57 to 59, and lines 65 to 67, that portion of the formulas reading $$\sum_{l=1}^{n} \quad \text{should read} \quad \sum_{\ell=1}^{n} \quad ;$$

line 30 should read as follows:

(i) Define $A_j^{(o)} = 1/m$ ;

line 31 and line 74, "$A_j^{(r)}$" should read -- $A_j^{(v)}$ --;

line 43, that portion of line 43 reading
"$(A_j^{(r+1)} - A_j^{(r)})$ for j=1,m" should read
-- $(A_j^{(v+1)} - A_j^{(v)}) < \epsilon$ for j=1,m -- ;

lines 45 and 49, "$A^{(r+1)}$" should read -- $A^{(v+1)}$ --;
line 55, after "write" insert -- it --;
line 68, "$S^{(r)}$" should read -- $S^{(v)}$ --.

Column 8, line 5, "$S^{(r)}$" should read -- $S^{(v)}$ --.

UNITED STATES PATENT OFFICE
CERTIFICATE OF CORRECTION

Patent No. 3,622,967            Dated November 23, 1971

Inventor(s) Manus R. Foster and Raymond L. Sengbush

It is certified that error appears in the above-identified patent and that said Letters Patent are hereby corrected as shown below:

Column 8, lines 7 to 9, that portion of the formula reading $$\sum_{1=1}^{n} \quad \text{should read} \quad \sum_{\ell=1}^{n} \quad ;$$

line 12, that portion of line 12 reading $$A_j^{(r+1)} \quad \text{should read} \quad A_j^{(v+1)} .$$

Signed and sealed this 9th day of May 1972.

(SEAL)
Attest:

EDWARD M. FLETCHER, JR.          ROBERT GOTTSCHALK
Attesting Officer                  Commissioner of Patents